Patented June 30, 1925.

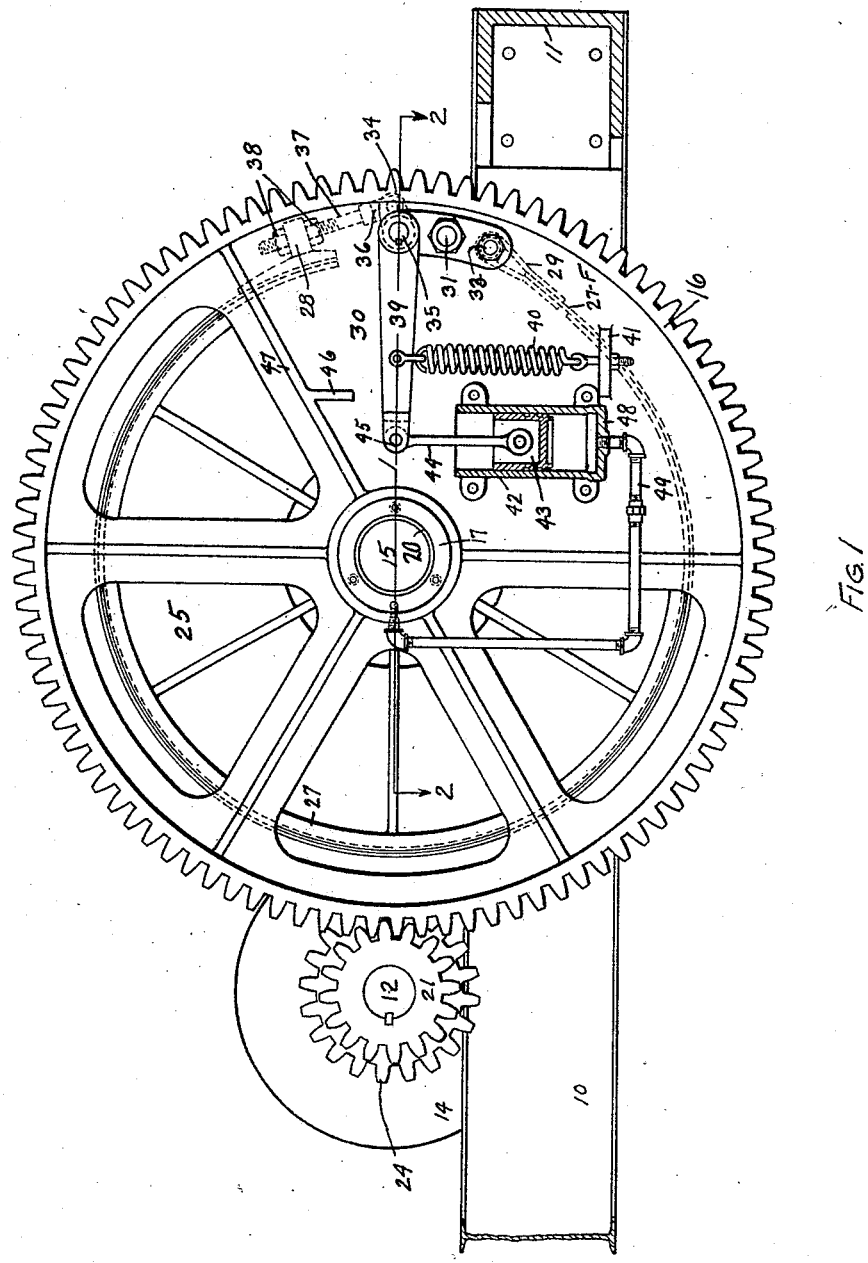

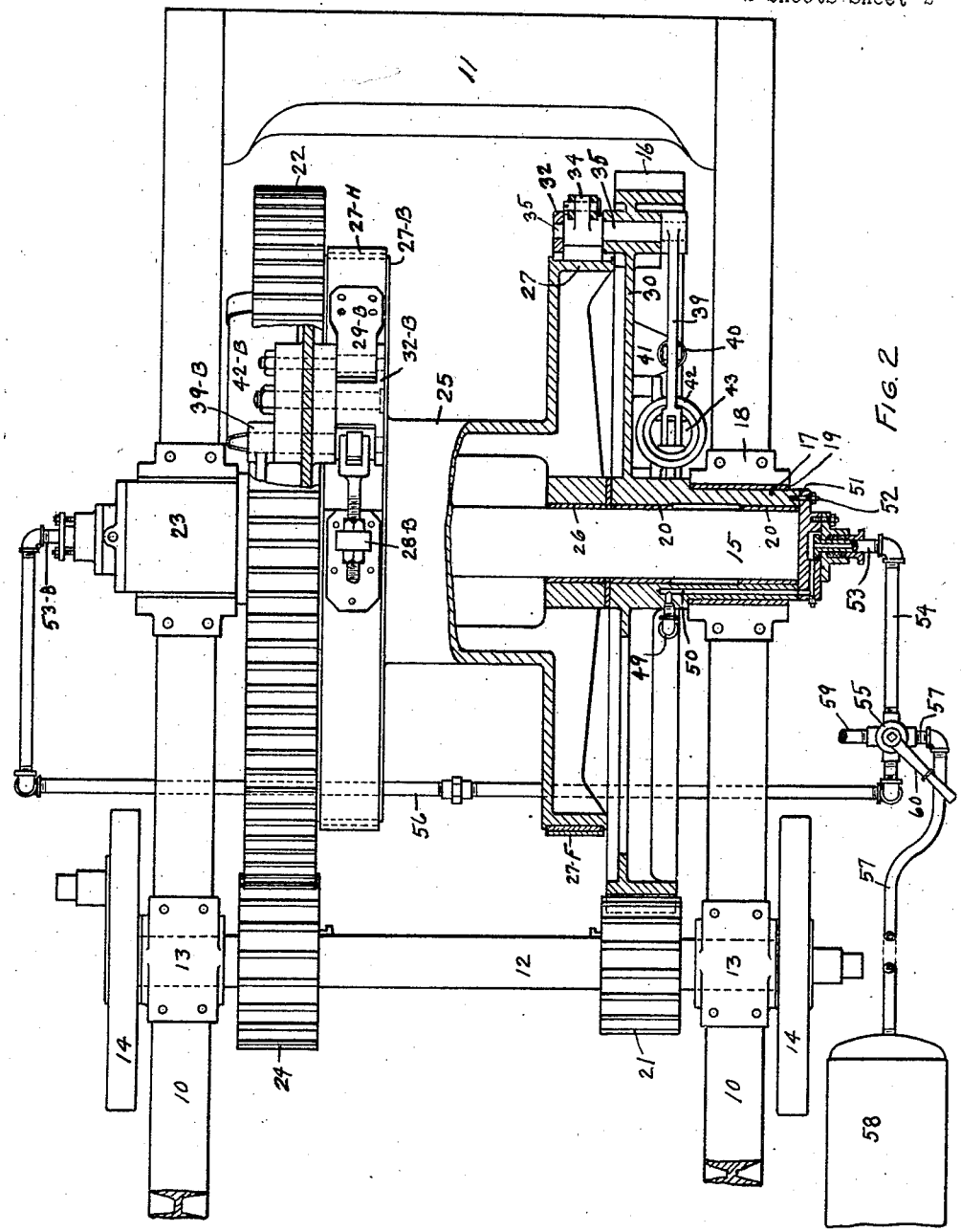

1,543,889

UNITED STATES PATENT OFFICE.

POWERS A. WICKES, OF PORTLAND, OREGON, ASSIGNOR TO WILLAMETTE IRON AND STEEL WORKS, OF PORTLAND, OREGON.

LOGGING ENGINE.

Application filed November 26, 1923. Serial No. 676,900.

*To all whom it may concern:*

Be it known that I, POWERS A. WICKES, a citizen of the United States, and a resident of Portland, in the county of Multnomah and State of Oregon, have invented a new and useful Logging Engine, of which the following is a specification.

This invention relates more particularly to the logging industry.

The main object of my invention is to provide an exceedingly simple and efficient two speed drum for logging engines and means for operating same.

A second object is the construction of the device in the manner that power may be applied and released very gradually.

A third object is the saving of time when replacing the friction elements in the woods.

A fourth object is the economy of power.

A fifth object is the utilization of the friction clutch employed in the two speed mechanism as a brake.

These and other objects will be more fully set forth in the specification following.

Logging engines having main drums capable of being driven at two speeds from the same drive shaft have long been known in the art. With such engines are usually found other drums which are driven at maximum speeds.

It must be possible, of course, when using variable speed main drums to change this speed when the drum is in motion, and it is highly desirable that power can be applied to this drum as gradually as possible, as, for instance, when starting heavy loads when the inertia can be overcome at slow speed and the change made to high speed when the load is under way.

In the design of this device special attention was paid to the utilization of parts which are easy to manufacture and assemble and are not subject to undue wear, and which are not dependent upon extreme accuracy to secure satisfactory operation.

It will be observed that in this device neither the gears nor the drum slide laterally on the drum shaft. When the drum must be moved it is often heavy with cable, and when the gears must be moved while running under load the friction is often very great. In either case, more power is required to control the application of power than is necessary with a resulting decrease in delicacy of control.

I accomplish these results in the manner set forth in the following specification and illustrated in the accompanying drawings, in which I have illustrated only those portions of a logging engine as are directly related to my device.

Figure 1 is an elevation of my device with part of the frame removed and a portion of the operating cylinder cut away for clearness. Figure 2 is a plan of Fig. 1 with portions cut away in a horizontal section along the line 2—2 in Fig. 1, having one of the gears cut away to show the interior parts in a different position than they appear in the other gear.

Similar numbers of reference refer to the same parts throughout the several views.

Referring in detail to the drawings, I have constructed my device upon the usual side beams 10 and cross beams 11. It will be understood that the usual engine and boiler are also mounted on this frame.

A drive shaft 12 journals in the bearings 13 which are mounted on the side beams 10. Cranks 14 are driven from the engine, not shown.

The main drum shaft 15 carries the loose gear 16 whose hub 17 journals in the bearing 18 which is preferably provided with a bushing 19. The gear 16 is also provided with bushings 20 which ride on the shaft 15. The small pinion 21 is keyed on the shaft 12 and meshes with the gear 16.

At the opposite end of the shaft 15 is placed a loose gear 22 which is somewhat smaller than the gear 16 but is mounted in the same way in the bearing 23. The gear 22 meshes with the large pinion 24 keyed on the drive shaft 12. A cable drum 25 is provided with bushings 26 which ride on the shaft 15 between the gears 16 and 22. The flange 27 of the drum 25 is grooved to receive the friction band 27$^F$, whose one end is provided with a bracket 28 and whose opposite end is provided with a clip 29.

The web 30 is provided with three holes, in the central one of which is placed a shouldered pin 31 which passes through the connection 32 and secures same to the web 30. The clip 29 is attached to the connection 32 by means of a bolt 33, and the rocker arm 34 whose trunnions 35 journal in the remaining hole and in the connection 32, is provided with a jaw 36 whose bolt 37 is secured to the bracket 28 by means of the nuts 38. On the trunnion 35 is keyed the lever 39 which is urged by the spring 40 attached to a lug 41 on the web 30.

Mounted on the web 30 is a cylinder 42 provided with a piston 43 which is joined to the lever 39 by means of the connecting rod 44 and pin 45. A stop 46 is formed on the rib 47 to limit the travel of the lever 39. Air or water is admitted to the cylinder 42 through the head 48 by means of the pipe 49 which connects with the passage 50 in the hub 17.

Over the projecting hub 17 is secured a cover plate 51 by means of the bolts 52 to which is secured a packed connection 53 through which air or water can find its way through the member 17 into the passage 50, or vice versa. The pipe 54 leads to a four-way valve 55, and the pipe 56 leads from the valve 55 to the member 53ᴮ at the opposite end of the shaft 15. The pipe 57 leads from the valve 55 to the source of pressure 58. A waste pipe 59 and lever 60 are provided for the valve 55.

On the gear 22 I have provided the same parts as on the gear 16, including a cylinder 42ᴮ, connection 32ᴮ and lever 39ᴮ. On the flange 27ᴮ is a brake band 27ᴴ which is joined to the connection 32ᴮ by the members 28ᴮ and 29ᴮ.

The operation of my device is as follows: When bringing in a heavy log the load is started by admitting air to the cylinder 42 which actuates the clutch or friction band 27ᶠ, which, in turn, causes the large gear 16 to drive the drum 25. When the load is started the air is cut off from the cylinder 42 and admitted to the cylinder 42ᴮ. By operating the valve 55 air is exhausted from the cylinder 42 before it is admitted to the cylinder 42ᴮ and the smaller gear 22 now drives the drum 25 at a higher speed than it was driven by the gear 16.

Conditions may exist when the order of operation is reversed, or either one or other of the gears may be used continuously as desired.

It will also be observed that the usual brake drum is omitted from this device since its use is rendered unnecessary by the presence of the friction bands, which may also be utilized as brake bands.

I am aware that logging engines have been constructed in the past in which either the driving gears or cable drum were caused to slide along the shaft, and in some instances the blocks on the sides of the gears were employed to bring either the high or low speed drive gears in engagement with the cable drum. It is to avoid the well known difficulties encountered with such devices that I have constructed my device.

What I claim is:

1. In a logging engine, the combination of a side frame; a gear having a hub journaling in and projecting through said side frame; a shaft mounted in said gear; a drum on said shaft concentric with said gear; fluid actuated friction means between said gear and drum; a cover plate on said hub; and a swivel coupling on said hub adapted to deliver fluid through said cover plate and hub to said friction means.

2. In a logging engine, the combination of a pair of side frames; a gear on the inner side of each of said frames having hubs journaling in their nearest frame; a shaft mounted between said gears; a drum on said shaft; flanges on both sides of said drum; fluid actuated band frictions between each gear and its adjacent drum flange; and means for admitting fluid through said hubs to their respective band friction operating devices.

3. In a logging engine, the combination of a pair of spaced side frames; a drive shaft journaling in said side frames; unequal pinions secured on said drive shaft; a large gear meshing with the smaller pinion and having a hub which journals in a side frame; a small gear meshing with the larger pinion and having a hub which journals in a side frame; a shaft mounted concentrically with and between said gears; a drum on said shaft having friction flanges formed on each side thereof; a band friction on each of said gears encircling its adjacent friction flange; a fluid actuated band operating mechanism on each of said gears; and means for admitting fluid under pressure through each of said gear hubs to its respective band operating device.

4. In a logging engine, the combination of a frame; bearings on said frame; a small gear provided with a hub which journals in one of said bearings; a large gear provided with a hub which journals in an opposite bearing; a drum shaft supported by said gears and journaling therein; a cable drum loosely mounted on said shaft between said gears and having a friction flange at each end; and a friction band around each flange operated from its adjacent gear.

5. In a logging engine, the combination of a side frame; a gear having a hub which journals in said side frame; a swivel coupling on said hub adapted to admit fluid through said hub to said gear; a cylinder on said gear connected with said swivel coupling; a shaft concentric with said gear; a drum on said shaft; and a fluid actuated friction means between said gear and drum.

6. In a logging engine, the combination of two spaced frames; a drive shaft mounted across said frames; unequal pinions secured on said drive shaft; a pair of unequal concentric gears which mesh with said pinions whose hubs journal in and project through said side frames; a drum mounted concentrically with and between said gears; a friction driving clutch between each of said gears and said frame; a source of compressed air; an air cylinder on each of said gears for operating its clutch; swivel pipes on each of said hubs connecting said source of air to its respective cylinder; and a valve between said swivel pipes and said source of air adapted to admit air to their cylinder and at the same time waste air from the opposite cylinder.

7. In a logging engine, the combination of a frame; bearings on said frame; a small gear provided with a hub which journals in one of said bearings; a large gear provided with a hub which journals in an opposite bearing; a drum shaft supported by said gears and journaling therein; a cable drum loosely mounted on said shaft between said gears and having a friction flange at each end; a friction band around each flange operated from its adjacent gear; an air cylinder on each gear for actuating said bands; a cover plate on the end of each gear hub; a swivel air coupling in each cover plate arranged to deliver air through said cover plate and hub into the nearest cylinder; a source of compressed air; a valve means for controlling the application of air to the opposite cylinders.

8. In a logging engine, the combination of a pair of spaced side frames; a drive shaft mounted across said frames; unequal pinions secured on said drive shaft; a drum mounted between said frames; unequal driving gears meshing with said pinions and having hubs projecting through said side frames concentric with said drum; band friction means mounted between said gears and drum; a cylinder on each gear adapted to actuate its band in a manner to engage its gear and said drum; a spring for disengaging said gear and drum; and means for admitting air through each projecting hub and its gear to the cylinder on said gear.

9. In a logging engine, the combination of a drum shaft; a double friction flanged drum loosely mounted on said shaft; a gear loose on said shaft against said drum; a small gear loose on said shaft against the opposite end of said drum, each gear having an out-turned hub; friction bands for driving said drum from either gear; a lever on each gear for applying its friction bands to its friction flange; an air cylinder on each gear arranged to operate said levers separately; a spring for releasing each friction band; a cover plate over each out-turned hub, said hub and cover plate having channels formed therein joined by a pipe to their nearest cylinder; a swivel connection opening into said cover plate channel; a source of compressed air; and a four-way valve for controlling the application of air to both cylinders.

POWERS A. WICKES.